June 3, 1969
A. BLUMER
3,447,776
PLURAL MAGNET OPERATED POPPET VALVE
Filed Nov. 30, 1966
FIG. 2
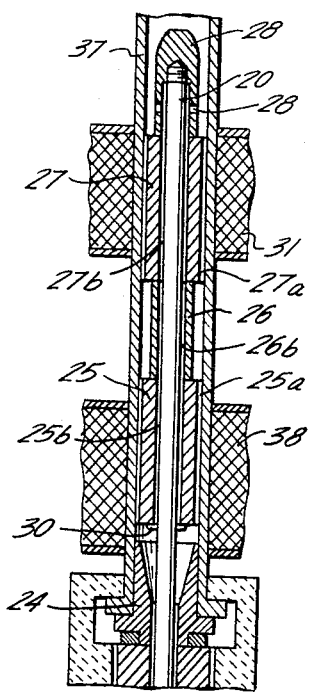
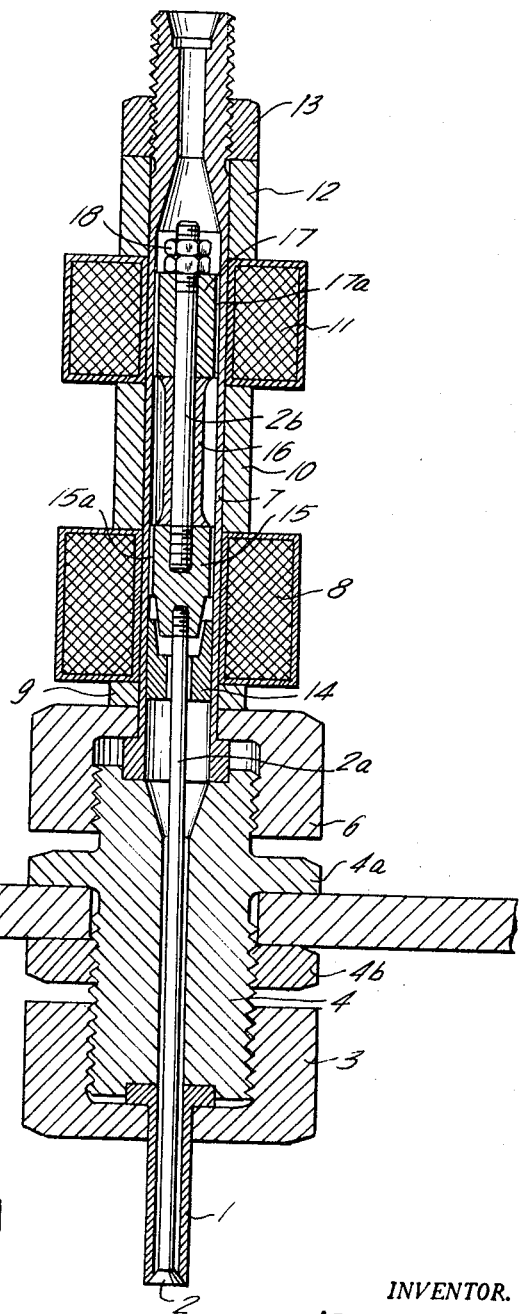
FIG. 1
INVENTOR.
ARMIN BLUMER
BY
Harry Ernest Rubens
ATTORNEY

United States Patent Office 3,447,776
Patented June 3, 1969

3,447,776
PLURAL MAGNET OPERATED POPPET VALVE
Armin Blumer, Schwanden, Switzerland, assignor to Maschinenfabrik Und Giesserei Netstal AG, Netstal, Switzerland
Filed Nov. 30, 1966, Ser. No. 598,061
Claims priority, application Switzerland, Dec. 1, 1965, 16,593/65
Int. Cl. F16k 31/08, 31/10
U.S. Cl. 251—65     3 Claims

ABSTRACT OF THE DISCLOSURE

A poppet valve is disclosed and shown in the drawing which includes a valve head mounted on a stem movably extending through a tube, forming the valve passage which tube in accordance with the invention is surrounded by first and second magnets cooperating with first and second armatures mounted on said stem and operable by said magnets so as to move said stem and valve head axially within said tube. The inventive feature relates to the arrangement and assembly of valve head, stem and armatures so as to form a rigid and compact unit, permitting a relatively unobstructed throughflow in the open position of the valve, being easy to remove for cleaning purposes and being movable between two abuttments defining the open and closed valve position respectively.

---

The present invention relates to a poppet valve having a valve head movable coaxially with respect to the valve passage.

In proposed poppet valves of this kind, elements for operating the valve head are needed and these project into the valve passage. Usually, springs are likewise contained in the valve passage for urging the valve head either in the opening or closing direction. It is a common feature of these arrangements that, in addition to the valve head as such, other movable actuating or motion transmitting elements are also located in the valve passage. Consequently, the construction of the valve is fairly complicated, the plurality of movable parts increases the probability of the occurrence of trouble, and the presence of the parts makes it more difficult to keep the valve clean. Moreover, the elements required in the valve passage always undesirably impede the flow of the controlled fluid.

According to the invention there is provided a poppet valve comprising a valve head mounted on a stem, a tube through which said stem extends, first and second armatures mounted on said stem in spaced-apart relationship and adapted to move axially together with said stem within the tube, first and second magnets surrounding the tube and co-operable with the first and second armatures resepectively, the arrangement being such that the mangnet nearest the valve head is operable to move in its associated armature and hence the stem so as to open the valve and the magnet remote from the valve head is operable to move the other armature and hence the stem so as to close the valve.

The movable valve elements merely comprise the valve head and the armatures which are rigidly connected thereto via the stem. The valve body is free from openings in its walls. Springs or like elements which obstruct the valve passage and which are sources of trouble are entirely absent.

Specific embodiments of the invention will now be described by way of example with reference to the accompanying drawing in which:

FIGURE 1 shows in cross-section a valve in the closed position and

FIGURE 2 shows part of an alternative embodiment also in the cross-section.

With reference to FIG. 1 of the drawing one end of a valve tube 1 forms a seating for a circular valve head 2. A threaded ring 3 secures the tube 1 to one end of a base 4 mounted in an opening in a wall panel 5 which is gripped between a peripheral flange 4a and a nut 4b. Fitted to the other end of the base 4 by means of a threaded ring 6 is a tube 7 which cooperates with the valve tube 1 and with a coaxial bore in the base 4 to form a passage for fluid controlled by the valve. Mounted on the tube 7 is an electromagnet 8 which embraces the tube. The electromagnet is spaced from the shreaded ring 6 by a spacing member 9. A permanent magnet 11 also surrounds the tube 7 but is axially spaced in relation to the electromagnet 8 by a spacing member 10. A locating nut 13 at the end of another spacing member 12 positions and retains parts 8, 9, 10 and 11 on the tube 7. Affixed to the inside wall of the tube 7 within the region of the electromagnet 8 is a yoke 14 with a control bore through which the stem 2a of the valve head 2 passes without touching the yoke. The free end of the stem 2a is fitted into the conically tapered end of an armature 15. This conically tapered end is adapted to cooperate with a correspondingly shaped socket in the yoke 14. The aramature 15 which is guided by the inside wall of the tube 7 in the region of the electromagnet 8 is provided with axial slots 15a in its peripheral surface for the passage therethrough of fluid controlled by the valve. An extension 2b of the valve stem is threadedly engaged in the armature 15. At a distance from the armature 15 determined by a spacing sleeve 16 the extension 2b carries a second armature 17 secured thereto by nuts 18. The second armature 17 which is guided by the inside wall of the tube 7 in the region of the permanent magnet 11 is provided with axial slots 17a in its peripheral surface for the passage therethrough of fluid.

FIG. 1 of the drawings above shows the valve in its closed position. The valve head 2 rests in the seating formed by the axial end of the valve tube 1. No current passes through the electromagnet 8 and the permanent magnet 11 pulls armature 17 into its permanent magnetic field, thereby keeping the valve head 2 in the closed position by the pull transmitted through the extension 2b, the armature 15 and the valve stem 2a. For opening the valve the electromagnet 8 is energized. The aramture 15 is thus drawn into the interior of the electromagnet 8, i.e. downwardly as viewed in the drawing, overcoming the pull exerted by the armature of the permanent magnet 11, until it engages the yoke 14. The motion transmitted through the valve stem 2a causes the valve head 2 to be lifted off its seating and to open the valve port. The armature 15 and the yoke 14 are so constructed that fluid can flow through the tube 7 to the valve port without being impeded, even when the armature 15 engages the yoke 14. It will be understood that all the other elements which are rigidly connected to the valve head 2 are likewise so shaped and fitted into the tube 7 such that the pressure drop through the valve is kept as small as possible. Moreover, the described valve can be flushed out quite easily in order to clean it.

In the embodiment illustrated in FIG. 2 which is in principle of similar construction to that described with reference to FIG. 1 fluid can flow through axial slots 27a and 25a in the outer peripheral surfaces of armatures 27 and 25 and also through annular passages 27b and 25b surrounding stem 20 via radial openings 28a provided in a cap 28 surmounting the upper end of the stem 20. Fluid can then flow down the stem 20 to yoke 24. In this embodiment the yoke 24, which preferably consists of a nonmagnetic corrosion-proof material, also forms a stop for armature 25 and thereby limits the opening displacement of the valve head (not shown). A pin 30 which passes transversely through the stem 20 prevents the armature 25 from sliding down the stem 20. The clearances provided by passages 25b and 27b and the annular passage 26b formed by spacing member 26 between the armatures 25 and 27 prevent the valve stem 20 from jamming in the bores of the armatures should the relatively thin valve stem not be prefectly straight. In this form of construction two magnets 31 and 38, corresponding to magnets 11 and 8 in FIG. 1 respectively, surround the tube 37. It may be noted that the armatures 31 and 38 and the spacing members 26 between the pin 30 and the cap 28 have some axial clearance to ensure that the armatures are always freely movable inside the tube 37.

In the above described embodiments the valve is closed by a permanent magnet and opened by an electromagnet. It will be readily understood that electromagnets could be provided for both purposes. Alternatively, an electromagnet might be provided for closing the valve and a permanent magnet for opening the valve.

What I claim is:

1. A poppet valve comprising a valve head mounted on a stem, a tube through which said stem extends, first and second armatures mounted on said stem in spaced-apart relationship and adapted to move axially together with said stem within the tube, first and second magnets surrounding the tube and co-operable with the first and second armatures respectively, the arrangement being such that the magnet nearest the valve head is operable to move its associated armature and hence the stem so as to open the valve, and the magnet remote from the valve head is operable to move the other armature and hence the stem so as to close the valve, and a base member, said tube being mounted on one side of the base member, a second tube having a valve seat mounted on the other side of the base member, said base member being formed with a bore coaxial with the tubes and each tube being secured to the base member by a threaded ring.

2. A poppet valve comprising a valve head mounted on a stem, a tube through which said stem extends, first and second armatures mounted on said stem in spaced-apart relationship and adapted to move axially together with said stem within the tube; first and second magnets surrounding the tube and co-operable with the first and second armatures respectively, the arrangement being such that the magnet nearest the valve head is operable to move its associated armature and hence the stem so as to open the valve, and the magnet remote from the valve head is operable to move the other armature and hence the stem so as to close the valve, a spacing member for maintaining the armatures in spaced-apart relationship on the stem, said armatures and spacing member therefore being mounted on the stem with radial clearance between the stem and the armatures and also between the stem and the spacing member for the aramatures thereby, providing a passage for fluid.

3. A poppet valve comprising a valve head mounted on a stem, a tube through which said stem extends, first and second armatures mounted on said stem in spaced-apart relationship and adapted to move axially together with said stem within the tube; first and second magnets surrounding the tube and co-operable with the first and second armatures respectively, the arrangement being such that the magnet nearest the valve head is operable to move its associated armature and hence the stem so as to open the valve, and the magnet remote from the valve head is operable to move the other armature and hence the stem so as to close the valve, and a yoke of nonmagnetic material fixed inside the tube between the armature nearest the valve head and the valve head to limit the cross-section of the tube and to limit movement of the armature nearest the valve head in the direction for opening the valve.

References Cited

UNITED STATES PATENTS

| | | | |
|---|---|---|---|
| 1,085,425 | 1/1914 | Hobe | 251—139 X |
| 2,322,911 | 6/1943 | Beam | 251—137 X |
| 2,598,754 | 6/1952 | Booth | 251—137 X |
| 3,023,576 | 3/1962 | Musgrave | 251—65 X |
| 3,190,608 | 6/1965 | Hassa | 251—137 X |
| 3,361,161 | 1/1968 | Schwartz | 251—65 X |

FOREIGN PATENTS

| | | |
|---|---|---|
| 878,230 | 9/1942 | France. |
| 936,838 | 12/1955 | Germany. |

ARNOLD ROSENTHAL, *Primary Examiner.*

U.S. Cl. X.R.

251—137, 139